June 2, 1964
G. F. BOYS
3,135,508
VEHICLE SPRING SUSPENSIONS
Filed March 13, 1963
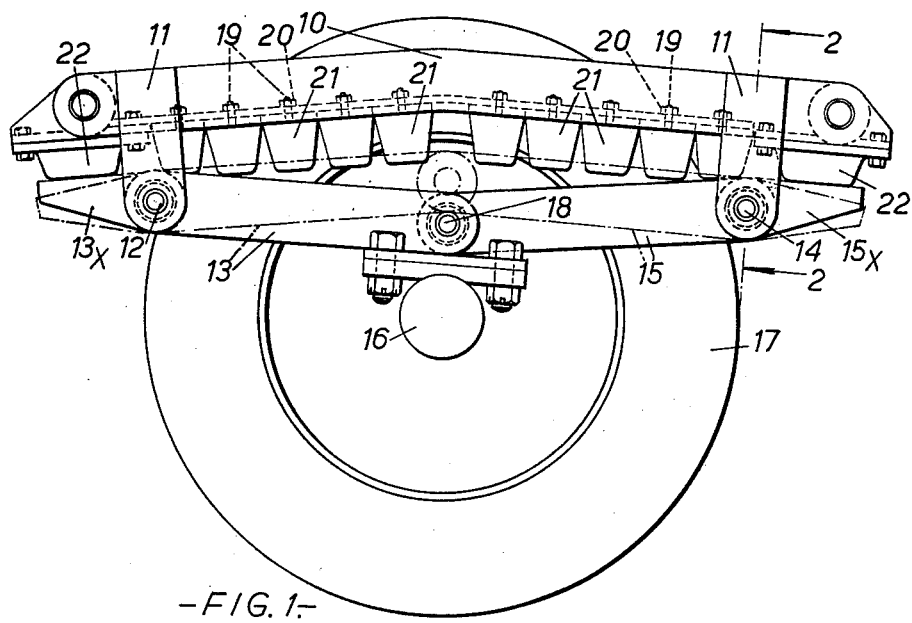
-FIG. 1.-
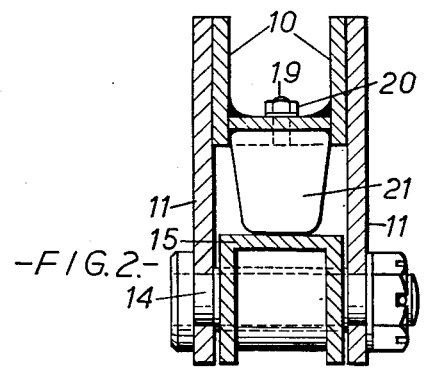
-FIG. 2.-
INVENTOR:
Godfrey Frank Boys
BY
Scrivener and Parker United States Patent Office 3,135,508
Patented June 2, 1964

3,135,508
VEHICLE SPRING SUSPENSIONS
Godfrey F. Boys, 20 Highgate Drive, Walsall, Staffordshire, England, assignor of one-half to Henry Boys & Son Limited, Walsall, England
Filed Mar. 13, 1963, Ser. No. 264,972
Claims priority, application Great Britain Mar. 27, 1962
4 Claims. (Cl. 267—21)

This invention relates to vehicle spring suspensions, the chief object being the provision of a new or improved spring suspension the rating of which will vary in accordance with the loading.

In a vehicle spring suspension according to the present invention, the axle associated with a pair of ground wheels is carried at each of its ends by adjacent ends of two lever arms which are directed one forwardly and the other rearwardly from said axle and are mounted at their remote ends for angular movement about fixed horizontal axes at appropriately spaced points on a longitudinally disposed rigid beam, and the angular movement of said lever arms in relation to said beam is controlled by elements of resilient material interposed between opposed surfaces on said lever arms and said beam, said elements of resilient material extending away from said fixed horizontal axes toward the vertical axial plane of said axle so that, with progressive increase in loading and consequent reduction of the included angles between the beam and the lever arms, the surface area of the resilient material which comes under compression, and consequently the spring rate of the suspension, also increases progressively.

Preferably the beam, which is afforded by or is affixed to the vehicle chassis or body, extends forwardly beyond the forward pivotal mounting and rearwardly beyond the rear pivotal mounting, and the two lever arms have end extensions beyond their respective pivotal mountings, whilst auxiliary resilient elements are interposed between the beam extensions and corresponding end extensions of said lever arms so as to pre-load the suspension, said auxiliary resilient elements being in compression when the vehicle is unladen and thereby serving to maintain an initial compression upon the main resilient elements over short lengths, and corresponding areas, of the lever arms nearer their pivotal mountings.

The invention will now be described with reference to the embodiment shown, by way of example, in the accompanying drawing, wherein:

FIG. 1 is a side elevation of the suspension, and FIG. 2 is a section taken on the line 2.2 of FIG. 1.

Referring to the drawings, 10 is a rigid longitudinally disposed beam which is afforded by or adapted to be fixed to one of the longitudinal side members of the vehicle chassis or body (not shown). The beam 10 is of channel cross section and has welded or otherwise fixed to its side flanges and at opposite ends thereof pairs of depending brackets 11, the brackets 11 at the forward end having aligned bearings for a horizontal pivot pin 12 upon which the forward end of lever arm 13 is pivoted and the brackets 11 at the rear end being similarly provided with a pivot pin 14 for the pivotal mounting of the rear end of a lever arm 15. The rear end of the lever arm 13 has fixed thereto the dead axle, or axle casing 16 associated with the pair of ground wheels 17, one at each side, and the adjacent ends of the lever arms 13, 15 have a pivotal connection at 18 which allows sufficient play to enable the toggle-like linkage afforded by said levers 13, 15 to pass through dead centre from the normal or unloaded position shown in full lines to a loaded position as shown in chain dotted lines (see FIG. 1), and vice versa. The lever arms 13, 15 are of inverted channel cross section and have end extensions $13^x$, $15^x$ beyond their pivotal mountings or pins 12 and 14 respectively.

Secured by screwed studs 19 and nuts 20 to the underside of the base of the beam 10 are two series of five rubber or other appropriate resilient elements 21, one series confronting the upper surface of the lever arm 13 and the other series confronting the upper surface of the lever arm 15, each such series extending from adjacent the pivotal mounting of the associated lever arm 13 or 15 toward and almost to the vertical axial plane of the wheel axle 16. Preferably, as shown in FIG. 1, the beam 10 has end extensions beyond the pivotal mountings 12 and 14 and auxiliary resilient elements 22 of rubber or other appropriate material are secured to the underside of said beam end extensions for co-operation with the upper faces of lever arm extensions $13^x$ and $15^x$.

The arrangement is such that when the vehicle is unladen the auxiliary resilient elements 22 engaging the upper surfaces of the lever arm extensions $13^x$ and $15^x$ are in compression and serve to maintain an initial compression upon those main resilient elements 21 which are nearer the respective pivotal mountings of the lever arms 13 and 15 and over corresponding short lengths and areas of the latter. As the vehicle load is increased, the included or internal angles between the lever arms 13 and 15 and the beam 10 decrease in accordance with the loading so that the main resilient elements 21, and progressively more of them, are subjected to increased compression over greater lengths and correspondingly greater areas upon the lever arms 13 and 15, whilst the auxiliary resilient elements 22 are relieved of compression and become disengaged from the lever arms 13, 15, as shown in chain lines in FIG. 1.

The main resilient elements 21, instead of being secured to the underside of the beam 10, may be secured to the upper surfaces of the lever arms 13, 15 and, in either case, they would extend inwardly, from points near the pivotal mountings of said arms, for a sufficient distance to accommodate loadings under normal conditions and also to absorb road shocks; in the latter connection shock rebound would be cushioned by the auxiliary resilient elements 22 between the end extensions of the beam 10 and the respectively confronting end extensions $13^x$ and $15^x$ of said lever arms 13 and 15.

Whereas a beam 10 of very shallow inverted V-shape as seen in side elevation (FIG. 1) is to be preferred, it will be understood that the said beam may be straight.

The resilient elements of rubber or other appropriate material are preferably removably secured to the beam or to the lever arms so that said elements can be detached and replaced by others having different characteristics according to the loads to be carried and whether "hard" or "soft" springing is desired.

It will be appreciated that with the present invention, the axle is positively anchored by the forward lever arm and its pivotal mounting and consequently brake torque reaction will be eliminated, and that the suspension affords spring support distributed over the length of the beam forwardly and rearwardly of the axle, such support being progressively increased, in accordance with the load supported, and affording flexible cushioning up to full loading and maximum bump conditions. It may well be that shock rebound can be satisfactorily absorbed by auxiliary resilient elements 22 at one end only of each of the two beams 10, in which event the auxiliary elements 22 at the other end and the associated beam and lever arm extensions at said other end may be omitted or dispensed with.

Having fully described my invention, what I claim and desire to secure by Letters Patent is:

1. A vehicle spring suspension for a vehicle having a chassis and also having an axle supporting a ground wheel, comprising a pair of pivotally connected lever arms respectively extending forwardly and rearwardly from said axle, a longitudinally disposed beam carried by the chassis, means for pivotally mounting the free ends of said lever arms for angular movement about fixed horizontal axes at spaced points on said beam, and means for controlling the angular movement of said lever arms in relation to said beam comprising a plurality of resilient elements interposed between the lever arms and the beam, said elements extending from said pivotal mountings toward the vertical axial plane of the axle so that, with progressive increase in loading and consequent reduction of the included angles between the beam and the lever arms, the surface area of the resilient elements which comes under compression, and consequently the spring rate of the suspension also increases progressively, said beam having end portions respectively extending forwardly and rearwardly beyond said pivotal mountings, and said lever arms having end portions respectively extending beyond said pivotal mountings, auxiliary resilient elements interposed between the end portions of said beam and the end portions of said lever arms to preload the suspension, the auxiliary resilient elements being in compression when the vehicle is unloaded to thereby maintain an initial compression upon the first named resilient elements over relatively short lengths and corresponding areas adjacent said pivotal mountings.

2. A vehicle spring suspension as claimed in claim 1, wherein the resilient elements are secured to underside of the rigid beam.

3. A vehicle spring suspension as claimed in claim 1, wherein the axle is positively anchored by the forward lever arm and its pivotal mounting.

4. A vehicle spring suspension as claimed in claim 1, wherein the beam is of channel section and the lever arms are of inverted channel section.

References Cited in the file of this patent

UNITED STATES PATENTS

| 1,514,796 | Seymour | Nov. 11, 1924 |
| 2,562,501 | Madden | July 31, 1951 |
| 2,993,707 | Vaugoyeau | July 25, 1961 |

FOREIGN PATENTS

| 527 | Great Britain | of 1910 |
| 376,841 | Great Britain | July 21, 1932 |